T. J. & G. L. HALES.
ANIMAL POKE.
APPLICATION FILED OCT. 25, 1915.
1,183,189.
Patented May 16, 1916.
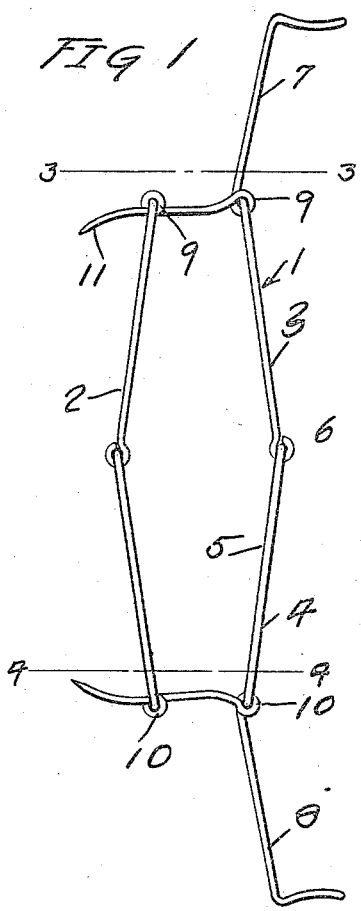
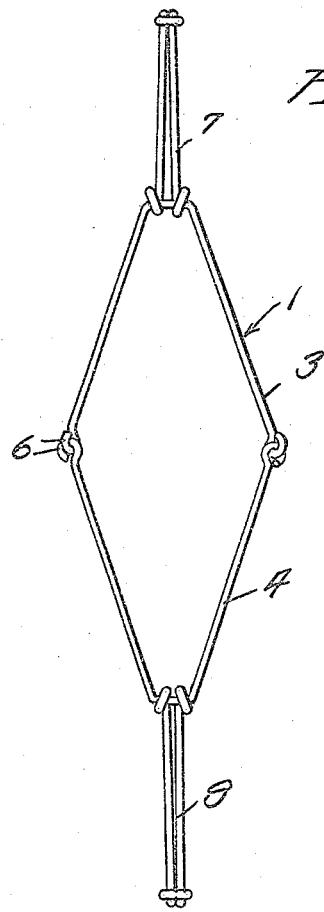
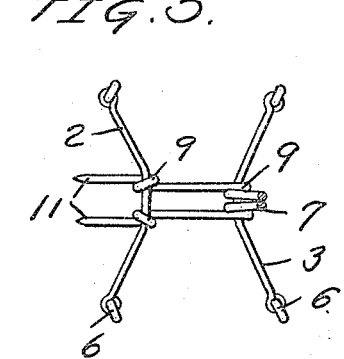
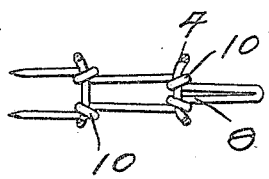
Inventor
T. J. Hales
G. L. Hales
Witnesses
By
Attorneys

UNITED STATES PATENT OFFICE.

THOMAS J. HALES AND GEORGE L. HALES, OF WALTER, OKLAHOMA.

ANIMAL-POKE.

1,183,189.  Specification of Letters Patent.  Patented May 16, 1916.

Application filed October 25, 1915. Serial No. 57,824.

*To all whom it may concern:*

Be it known that we, THOMAS J. HALES and GEORGE L. HALES, citizens of the United States, residing at Walter, in the county of Cotton, State of Oklahoma, have invented certain new and useful Improvements in Animal-Pokes; and we do hereby declare the following to be a full, clear, and exact description of the invention, such as will enable others skilled in the art to which it appertains to make and use the same.

The present invention is directed to improvements in animal pokes, and has for its object to so construct a device of this character that should the animal attempt to pass through a fence or restricted opening, pressure on the device will actuate spurs, which when actuated will inflict pain upon the animal.

A further object of the invention is to provide a device of this character which is extremely simple in construction, efficient in operation, and one which can be manufactured at a very small cost.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a front view. Fig. 3 is a sectional view on line 3—3 of Fig. 1. Fig. 4 is a similar view on line 4—4 of Fig. 1.

The device comprises a pair of neck engaging members 1 and 2, each of which consists of upper and lower frames 3 and 4, respectively, the arms 5 of which being convergingly arranged. The arms 5 of the frames are provided with eyes 6 which are interlocked to pivotally connect the frames. Hooks 7 and 8 are provided, and are formed from single lengths of wire, bent upon themselves to provide eyes 9 and 10, said eyes terminating in spurs 11. The eyes 9 and 10 of the hooks 7 are pivotally engaged with the bights of the upper frames 3, while the eyes of the hook 8 are engaged with the bights of the lower frame 4. The eyes 6 not only serve as means for pivotally connecting the frames, but also permit the arms 5 of the frames to be sprung outwardly when it is desired to apply or remove the neck of the animal.

The device is preferably made from stout metal rods, bent so as to provide the frames and hooks.

From the foregoing description it will be seen that should an animal wearing a poke, such as described, attempt to pass between the line wires of a fence, that the hooks 7 and 8 will engage the wires, which action will cause the hooks to swing, thus causing the spurs to engage in the animal's neck so that further attempt on the part of the animal to pass through the fence will be frustrated incident to the pain produced by the pricking of the spurs.

What is claimed is:—

An animal poke comprising a pair of neck engaging members, each consisting of upper and lower frames, the arms of each frame being pivotally connected, hooks having eyes carried thereby adapted to pivotally engage the bights of each frame, certain of said eyes terminating in spurs adapted to be rocked when the hooks engage an obstacle.

In testimony whereof we affix our signatures in the presence of two witnesses.

THOMAS J. HALES.
GEORGE L. HALES.

Witnesses:
O. S. DICKERSON,
GEO. W. GRAHAM, Jr.

Copies of this patent may be obtained for five cents each, by addressing the "Commissioner of Patents, Washington, D. C."